United States Patent [19]
Imao et al.

[11] Patent Number: 5,134,666
[45] Date of Patent: Jul. 28, 1992

[54] IMAGE SEPARATOR FOR COLOR IMAGE PROCESSING

[75] Inventors: Kaoru Imao, Yokohama; Satoshi Ohuchi, Hachioji, both of Japan

[73] Assignee: Ricoh Company, Ltd., Japan

[21] Appl. No.: 743,204

[22] Filed: Aug. 9, 1991

[30] Foreign Application Priority Data

Aug. 15, 1990 [JP] Japan ............... 2-214423

[51] Int. Cl.⁵ ................................. G06K 9/34
[52] U.S. Cl. ......................... 382/9; 358/452; 358/462; 358/466; 382/50
[58] Field of Search ............... 382/9, 50, 48; 358/450, 358/452, 453, 462, 464, 465, 466, 75

[56] References Cited

U.S. PATENT DOCUMENTS

| | | | |
|---|---|---|---|
| 4,750,209 | 6/1988 | Shimura et al. | 382/9 |
| 4,924,509 | 5/1990 | Yokomiza | 382/50 |
| 4,953,013 | 8/1990 | Tsuji et al. | 258/462 |
| 4,998,122 | 3/1991 | Kanno et al. | 382/50 |
| 5,001,767 | 3/1991 | Yoneda et al. | 382/50 |
| 5,014,124 | 5/1991 | Fujisawa | 358/462 |
| 5,025,481 | 6/1991 | Ohuchi | 382/9 |

FOREIGN PATENT DOCUMENTS 63-240175 10/1988 Japan .
2-140057 5/1990 Japan .

OTHER PUBLICATIONS

Nobuji Tetsutani et al., "Bilevel Rendition Method For Documents Including Gray-Scale and Bilevel Image", *Institute of Electronics and Communication Engineers of Japan*, (1984), Vol. J67-B, No. 7, pp. 781-788.

*Primary Examiner*—Joseph Mancuso
*Attorney, Agent, or Firm*—Mason, Fenwick & Lawrence

[57] ABSTRACT

An image region segmentation system for segmenting a color image into a number of elemental regions according to the type of images contained in the elemental region comprises a first detection circuit for discriminating whether an elemental region under processing contains a black pixel or not, a second detection means for discriminating whether the elemental region under processing contains a color pixel or not, a first discrimination circuit for discriminating the elemental region as to whether or not the region includes a black pixel and simultaneously no color pixels, a line image recognition circuit for discriminating as to whether the image in the elemental region under processing includes a line or not, and a second recognition circuit for discriminating such that the elemental region under processing represents a bi-level black line when the elemental region under processing contains a black pixel and simultaneously no color pixels and further simultaneously when the elemental region represents a line.

10 Claims, 5 Drawing Sheets

IMAGE SEPARATOR FOR COLOR IMAGE PROCESSING

BACKGROUND OF THE INVENTION

The present invention generally relates to image processing, and more particularly to an image separator for use in a color image processing apparatus for segmenting a color image that has been read by an image reading apparatus into regions that contain black line patterns, colored line patterns, and colored halftone pictures.

In the digital color copiers, and the like, an optimum image processing is needed according to the type of the images that is going to be recorded. For example, a typical color image may include black line portion such as the edge part of black characters and lines, colored line portions such as the edge part of colored characters and lines, and colored halftone images such as color pictures and screened color photographs that contain a number of color dots. Thereby, it is necessary to apply different image processing techniques adaptively according to the type of images to maximize the quality of images that are reproduced. As a result of such an optimum image processing, one may able to reproduce the black line portions or black characters by a black ink while the colored line portions or colored characters by colored inks. Further, one can reproduce the colored halftone images without the problem of forming moire. In order to apply such an optimum image processing adaptively according to the type of images, it is necessary to discriminate and segment the original images into regions that contain respective types of images.

Conventionally, a color image forming apparatus is known that applies such a segmentation of the original color images according to the Japanese Laidopen Patent Application 63-240175. This conventional apparatus extracts the region containing bi-level black images and characters from the original color image on the document and reproduces the region thus extracted by the black ink. The apparatus uses, for the purpose of recognition, the YMC (Yellow, Magenta, Cyan) signals that are obtained by a color correction process of the usual RGB (Red, Green, Blue) signals that in turn are obtained by the color decomposition of the original color images. The discrimination about the type of the images is achieved by comparing the level of the Y, M and C signals against a predetermined threshold. More specifically, the image on the document is segmented into a number of regions, and in each region, the image is recognized as a bi-level black image when the sum of the level of the Y, M and C signals has a level exceeding the predetermined threshold.

When applying this conventional process against the halftone, color dot images, however, there arises a problem of erroneous recognition of the images. In such a halftone, color dot images, it should be noted that the color dots forming the images and bearing the colors of Y, M or C are generally overlapped with each other. In other words, there occurs a case relatively often that the sum of the level of the Y, M and C signals obtained by reading the original image shows a level that exceeds the predetermined threshold, even though the image is not a black, bi-level image. Thus, it will be understood that the discrimination of whether a given color image represents the color picture pattern or bi-level black pattern is not a simple matter, and there is a substantial risk that one erroneously discriminates the color picture pattern as black, bi-level pattern. When such an erroneous recognition occurs, black and white images appear in the reproduced color image and the quality of the reproduced image is significantly deteriorated rather than improved. Thus, the foregoing conventional apparatus has suffered from the problem of erroneous segmentation of the image and deterioration in the quality of the reproduced color images.

SUMMARY OF THE INVENTION

Accordingly, it is a general object of the present invention to provide a novel and useful image processing apparatus wherein the foregoing problems are eliminated.

Another and more specific object of the present invention is to provide an image processing system for recognizing the type of a color image on a document and segmenting the image according to the type, with reliability.

Another object of the present invention is to provide an image region segmentation system for reading an image from a color document and for segmenting the image into a plurality of elemental regions defined in the image of the color document according to a type of the image that is contained in each elemental region, whether the elemental region contains a bi-level black line portion of the image, a colored line portion of the image or a halftone color picture, comprising: first detection means supplied with three primary color signals representing three primary colors of the image read from the color document for discriminating whether the elemental region under processing contains a black pixel or not; second detection means supplied with the three primary color signals for discriminating whether the elemental region under processing contains a color pixel or not; first recognition means supplied with an output of the first detection means representing the result of discrimination, for discriminating the elemental region under processing as to whether or not the region includes a black pixel while no color pixels simultaneously, based upon the result of discrimination by the first and second detection means; line image recognition means supplied with one of the three primary color signals of the image read from the document, for discriminating as to whether or not the image in the elemental region under processing includes a line portion; and second recognition means supplied with an output of the first recognition means representing the result of recognition and an output of the line image discrimination means representing the result of discrimination, for recognizing: that the elemental region under processing represents a bi-level black line pattern when the elemental region under processing contains a black pixel but no color pixels and simultaneously when the elemental region represents a line pattern; that the elemental region under processing represents a colored line portion when the elemental region under processing contains a color pixel and simultaneously when the elemental region represents a line portion; and such that the elemental region under processing represents a color halftone image when the elemental region under processing represents an image other than the line pattern. According to the present invention, one can recognize the type of the images on the document with reliability. Thereby, one can reproduce the black line portions such as the edge of the black characters on the document as black lines by the black ink, the colored line portions such as the edge of the colored characters on the document as colored lines by the color inks, and the colored halftone images on the document by the color inks as colored halftone pictures, without erroneous discrimination. Particularly, the discrimination of the elemental region that includes the black pixels is achieved based upon the process of confirmation of the existence of the black picture elements and simultaneously the non-existence of the colored picture elements. Thereby, the error in the discrimination of the type of the elemental region that has been common in the conventional color image processing apparatus is effectively eliminated and the quality of reproduced images is guaranteed.

Other objects and further features of the present invention will become apparent from the following detailed description when read in conjunction with the attached drawings.

DETAILED DESCRIPTION

Figure 1:
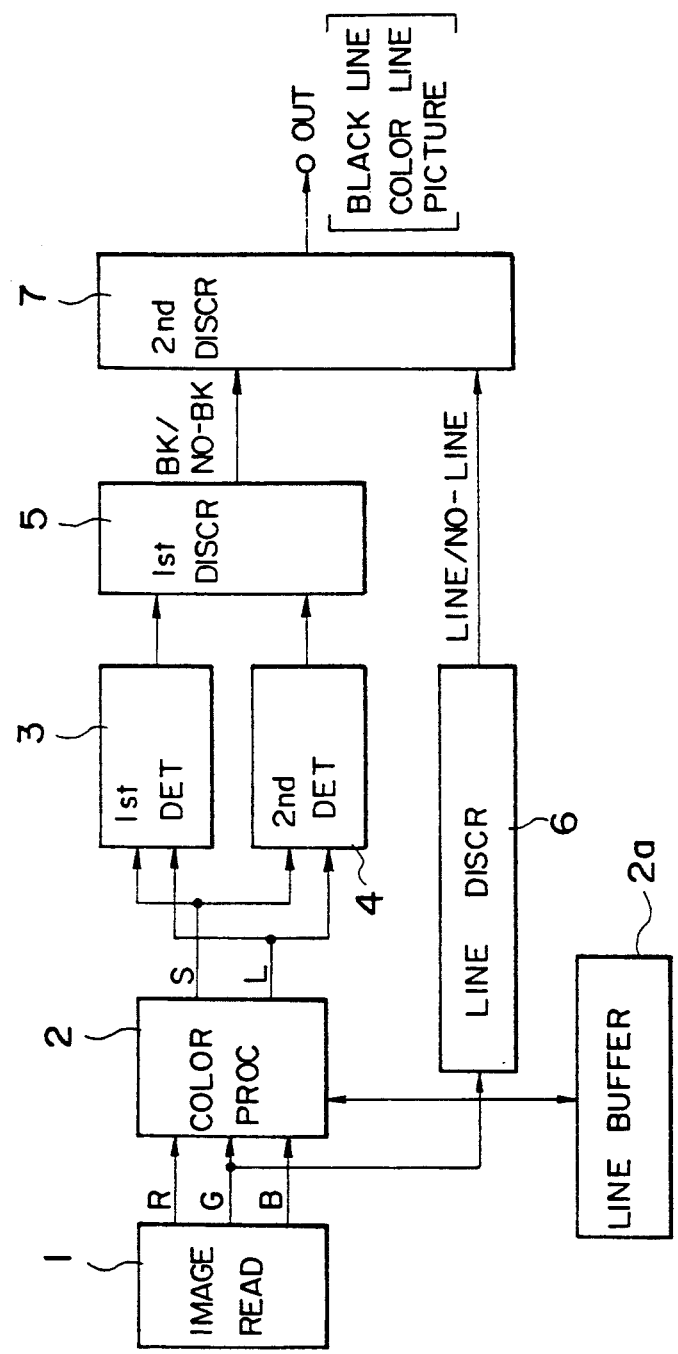
FIG. 1 is a block diagram showing the overall construction of the image processing system according to an embodiment of the present invention.

FIG. 1 shows the overall construction of the image processing system according to a first embodiment of the present invention.

Referring to FIG. 1, the system includes an image reader 1 for reading an image on a document. The image reader 1 may be a color scanner that uses a CCD or other suitable image sensors and produces three primary color signals R, G and B in the form of digital data for each pixel of the image. The digital color RGB signals are then supplied to a color processing circuit 2 for color discrimination. Further, the digital signal G of the RGB signals is supplied to a line pattern recognition circuit 6 for recognition of a line pattern. A separate color conversion circuit for converting the digital RGB signals to digital YMC signals may be provided after the image reader 12. In this case, the signal M for magenta is supplied to the line pattern recognition circuit 6.

Figure 3A:
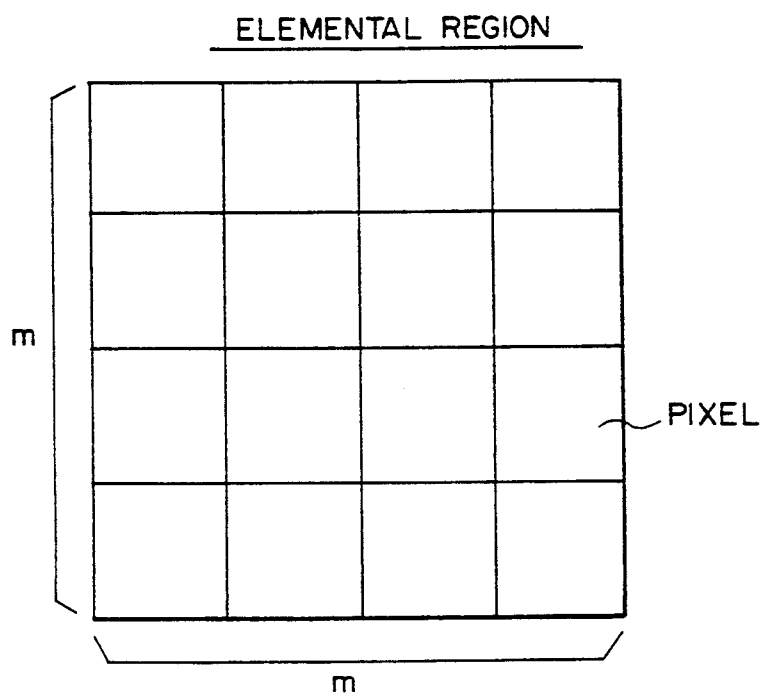
FIGS. 3(A) and 3(B) are diagrams for explaining the operation of the circuit of FIG. 2.

The color processing circuit 2 has a line buffer circuit 2a for storing the digital RGB signals produced by the image reader 1 for several lines, and samples the supplied digital color signals for each elemental region of FIG. 3(A) as will be described below. Further, the circuit 2 calculates a difference of the digital color signals RGB or YMC and selectively outputs the largest difference as a signal S defined according to the equation $$S = max(|R-G|, |G-B|, |B-R|).$$

Further, the circuit 2 selectively outputs the level of one of the RGB or YMC signals that has the largest level as a signal L according to the equation $$L = max(R, G, B).$$

Here, it should be noted that the notation "max" in the foregoing equations represents the selection of the maximum quantity from the quantities listed in the bracket.

The elemental region is a region that is defined in the image read from the document and includes a plurality of picture elements arranged in rows and columns. For example, the elemental region may include sixteen pixels arranged in 4×4 formation. See FIG. 3(A). Of course, the definition of the elemental region is not limited to this example, but other definition is possible. For example, the elemental region may be chosen to coincide with one pixel of the image. In the general case, the pixels are arranged in m×m formation in each elemental region.

The circuit 2 calculates the signals R, G and B as well as $|R-G|$, $|G-B|$ and $|B-R|$ for each pixel in the elemental region and selects the maximum of these quantities as the signals L and S. The signals S and L for each pixel in the elemental region are then supplied to a first detection circuit 3 and a second detection circuit 4, wherein the circuit 3 compares the signals S and L with respective predetermined levels and discriminates whether the elemental region that is under processing represents a black image or not.

Figure 2:
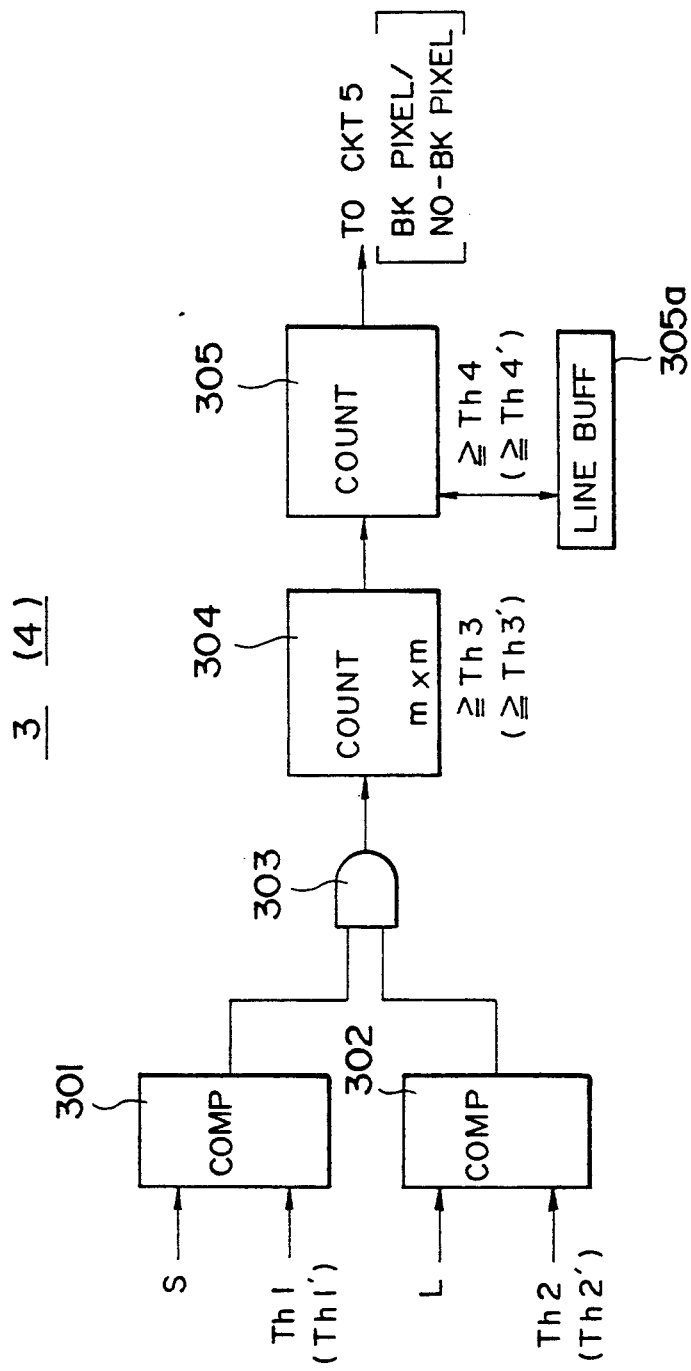
FIG. 2 is a block diagram showing a part of the circuit of FIG. 1.

FIG. 2 shows the construction of the first detection circuit 3.

Referring to FIG. 2, the first detection circuit 3 includes a comparator 301 that is provided for receiving the signal S from the circuit 2 and compares the signal S with a threshold level Th1. Thereby, the comparator 301 produces a high level output signal when the level of the signal S is smaller than the threshold Th1 (S<Th1). Otherwise, the comparator 301 produces a low level output. Similarly, another comparator 302 is provided for receiving the signal L from the circuit 2. The comparator 302 is supplied with another threshold level Th2 and compares the level of the signal L with the threshold level Th2. Thereby, the comparator 302 produces a high level output when the level of the signal L exceeds the threshold Th2 (L>Th2). In other words, the comparator 301 produces the high level output only when the difference in the level of the R, G, B signals is sufficiently small, while the comparator 302 produces the high level output only when the difference in the level of any of the signals R, G and B exceeds the threshold Th2.

The output of the comparator 301 and the output of the comparator 302 are then supplied to respective input terminals of an AND circuit 303 that produces a high level output only when the difference S is smaller than the threshold Th1 and the level L is larger than the threshold Th2. In other words, the AND circuit 303 produces the high level output each time when a black pixel is found in the elemental region that contains, in the present example, 4×4 pixels.

The output of the AND circuit 303 is then supplied to a counting circuit 304 that counts the number of black pixels that have been found in one elemental region. The counting circuit 304 is further supplied with a third threshold Th3 that is determined in response to the number of pixels included in one elemental region and produces a high level output only when the counted number of black pixels has exceeded the threshold Th3. Otherwise, the circuit 304 produces a low level output. Thus, the high level output produced by the counting circuit 304 represents that there is a black pixel included in the elemental region under processing. The elemental region that includes the black pixel will be referred to as an active block.

The output of the counting circuit 304 is then supplied to a correction circuit 305 that counts the number of active blocks included in a reference region that may be formed, for example, from 3×3 elemental regions. See FIG. 3(B). This correction circuit 305 produces a high level output only when the number of active blocks in the foregoing 3×3 elemental regions exceeds a predetermined threshold Th4. In other words, the correction circuit 305 does not produce the high level output even when it is discriminated in the circuit 304 that the elemental region under processing has produced the high level output, as long as the total number of the active blocks exceeds the threshold Th4. More specifically, the circuit 305 produces the high level output only when the block under processing includes the black pixels with a number exceeding the threshold Th3 and simultaneously when the number of active blocks exceeds the predetermined threshold Th4.

In order to store the information about the active blocks in the foregoing reference region, a line buffer 305a is provided in cooperation with the correction circuit 305. In other words, each time the correction circuit 305 identifies an elemental region as an active block, that block is entered into the line buffer at a corresponding address. The data thus entered is used later in the discrimination of other elemental blocks as described previously. It should be noted that when the elemental region is defined to be coincident to one pixel, the discrimination in the circuit 305 is achieved with highest reliability. On the other hand, one needs a large line buffer for the line buffer 305a. In the case when the elemental region is defined as including a number of pixels as shown in FIG. 3(A), the result of discrimination in the circuit 305 becomes rough. In the trade-off, however, one can reduce the size of the line buffer 305a.

The size of the reference region that is referenced by the circuit 305 for discrimination is of course not limited to 3×3. The output of the correction circuit 305 is supplied to a first discrimination circuit 5 of FIG. 1.

The second detection circuit 4 has a construction substantially identical with the circuit 3, except that the threshold levels Th1—Th4 are changed to threshold levels Th1'—Th4'. The threshold levels are set such that the elemental region under processing includes a color pixel or not, based upon the signals S and L produced by the color processing circuit 2. Thus, the comparator 301 produces a high level output when the level of the signal S has exceeded the threshold Th1' (S>Th1'). On the other hand, the comparator 302 produces a low level output when the level of the signal L has decreased below the threshold Th2' (L<Th2'). The output of the comparators 301 and 302 are then supplied to the AND gate 303. Thus, the AND gate 303 produces a high level output only when the difference in the level of the primary color signals R, G and B is large and at the same time the level of the individual color signals is relatively low. Typically, the threshold Th1' is set larger than the threshold Th1 (Th1'>Th1).

Figure 3B:
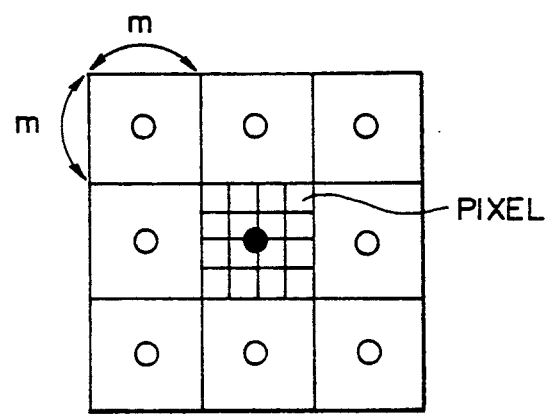

The circuit 304, used in the second detection circuit 4, then discriminates whether the elemental region under processing is an active block that includes color pixels or not, and the correction circuit 305 confirms, based upon the comparison with surrounding elemental regions shown in FIG. 3(B), whether the elemental region under processing represents a region where there are no black pixels. In the circuit 304, a threshold level Th3' is used instead of the threshold level Th3. Similarly, a threshold level Th4' is used in the circuit 305 of the second detection circuit 4 instead of the threshold level Th4.

Figure 4:
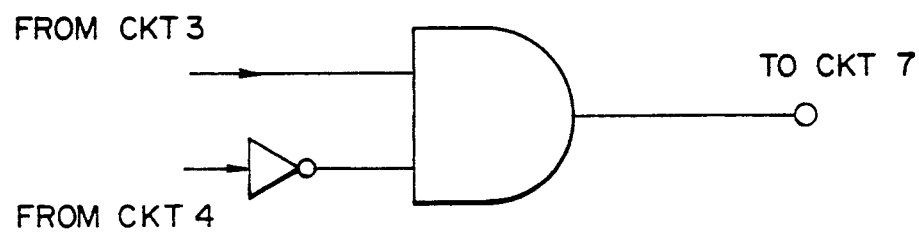
FIG. 4 is a circuit diagram showing a part of the circuit of FIG. 1.

Referring to FIG. 1 again, the output of the correction circuit 305 of the first detection circuit 3 and the output of the correction circuit 305 of the second detection circuit 4 are supplied to a first discrimination circuit 5. The first discrimination circuit 5 may be an AND gate supplied with the output of the first detection circuit 3 at a first input terminal directly and the output of the second detection circuit 4 at a second input terminal via an inverter as shown in FIG. 4. Thereby, the circuit 5 produces a high level output when the existence of the black picture element is confirmed in the elemental region under processing by the detection circuit 3 and simultaneously when the nonexistence of the color picture element is confirmed in the same elemental region by the detection circuit 4.

Further, there is provided a second discrimination circuit 7 that is supplied, on the one hand, with the output of the first discrimination circuit and an output of the line pattern recognition circuit 6.

Figure 5:
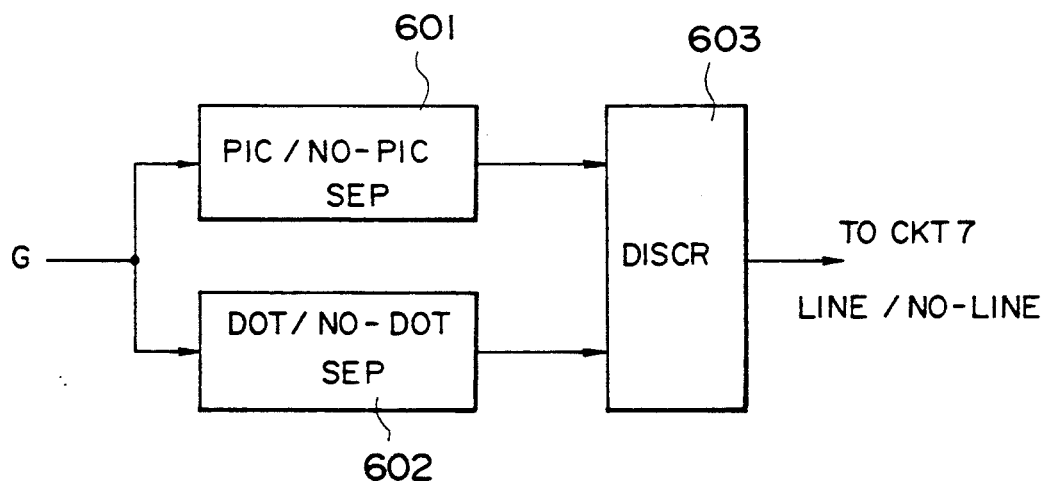
FIG. 5 is a block diagram showing the other part of the circuit of FIG. 1.

FIG. 5 shows the construction of the line pattern recognition circuit 6. As shown in FIG. 5, the circuit 6 includes a first segmentation circuit 601 for segmenting halftone images and non-halftone images from each other and a second segmentation circuit 602 for segmenting screened images and non-screened images from each other, and the output of the first and second segmentation circuits 601 and 602 are supplied to a discrimination circuit 603.

The circuit 601 may be the one that was disclosed by the applicants of the present invention in the Japanese patent application 1-113242 and achieves the detection of characters or non-halftone images by detecting the existence of a pattern of interconnected black pixels or white pixels in the elemental region. Thus, when the number of such interconnected patterns of black or white pixels has exceeded a predetermined threshold, the pixel in such a pattern is declared to be a candidate character pixel, and when there are a plurality of such candidate character pixels around a pixel under observation with a number exceeding a predetermined threshold, the pixel is decided to be a part of a character.

On the other hand, the circuit 602 may be the circuit that was disclosed by the applicants in the Japanese patent application 1-278559. According to the disclosure, the circuit 602 counts the pixels that form the dots of a graded image for each elemental region defined in the image, and declare the elemental region as a candidate region of dot. Based upon the distribution of density of the candidate region, the circuit 602 decides whether the elemental region forms a part of the dot image or not. The circuit 6 as a whole is disclosed in the U.S. patent application Ser. No. 700,421, which is incorporated herein as reference.

The discrimination circuit 603 may be a NOR gate and produces a high level output when the output of the circuit 601 is low, indicating that the image under processing is not a halftone image, and simultaneously when the output of the circuit 602 is low, indicating that the image under processing is not a screened image.

Figure 6:
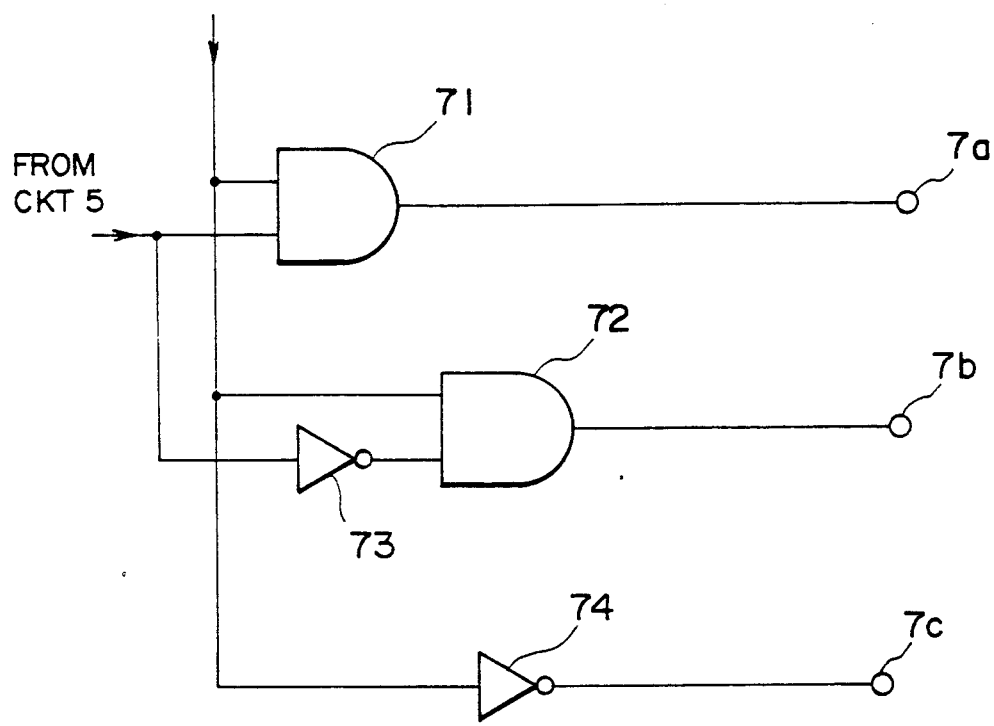
FIG. 6 is a block diagram showing still other part of the circuit of FIG. 1.

FIG. 6 shows the construction of the circuit 7.

Referring to FIG. 6, the circuit 7 includes an AND circuit 71 that has a first input terminal to which the output of the discrimination circuit 603 is supplied and a second input terminal to which the output of the line pattern recognition circuit 6 is supplied. Thus, the AND gate 71 produces a high level output at an output terminal 7a, when the circuit 5 and the circuit 6 both produce the high level output in correspondence to the existence of the line pattern in the elemental region and in correspondence to the existence of the black pixel and non-existence of the color pixel in the line pattern.

In the circuit 7, there is provided another AND gate 72 that is supplied with the output of the circuit 5 at a first input terminal via an inverter 73. Further, the AND gate 72 has a second input terminal to which the output of the line pattern recognition circuit 6 is supplied. Thereby, the AND gate 72 produces a high level output at an output terminal 7b when the elemental region representing a line pattern includes a color pixel. Further, the circuit 7 includes an inverter 74 that inverts the output of the circuit 6 and outputs the same at an output terminal 7c. Thereby, the output at the output terminal 7c assumes a high level state when the image in the elemental region represents an image other than the line.

By using the output of the second discrimination circuit 7 at the output terminals 7a–7c, one can achieve a high quality reproduction of images in the digital color copiers. For example, one can reproduce the elemental region defined in the original image and containing the black lines and black characters by using the black ink, after applying a high resolution processing. Such a high resolution processing may include the edge enhancement and binarization processes. Further, the elemental region that contains the color lines are reproduced by the YMC inks after applying a high resolution processing that also includes an edge enhancement and binarization. On the other hand, the elemental region that contains the halftone pictures is reproduced by the YMC inks after a gradation reproduction process. Such a gradation reproduction process may include smoothing and dither processes.

It should be noted that the present invention is by no means limited to color copiers but applicable to other apparatuses and systems that applies an image processing of color images. Such a system may include color image transmission systems and color filing systems.

Further, the present invention is not limited to the embodiments described heretofore, but various variations and modifications may be made without departing from the scope of the invention.

What is claimed is:

1. An image region segmentation system for reading an image from a color document and for segmenting the image into a plurality of elemental regions defined in the image of the color document according to a type of the image that is contained in each elemental region, whether the elemental region contains a bi-level black line portion of the image, a colored line portion of the image or a halftone color picture portion of the image, comprising:

first detection means supplied with three primary color signals representing three primary colors of the image read from the color document for discriminating whether the elemental region under processing contains a black pixel or not;

second detection means supplied with the three primary color signals for discriminating whether the elemental region under processing contains a color pixel or not;

first recognition means supplied with an output of the first detection means representing the result of discrimination, for discriminating the elemental region under processing as to whether or not the region includes a black pixel while no color pixels simultaneously, based upon the result of discrimination by the first and second detection means;

line image recognition means supplied with one of the three primary color signals of the image read from the document, for discriminating as to whether or not the image in the elemental region under processing includes a line portion; and second recognition means supplied with an output of the first recognition means representing the result of recognition and an output of the line image discrimination means representing the result of discrimination, for recognizing: that the elemental region under processing represents a bi-level black line portion when the elemental region under processing contains a black pixel but no color pixels and simultaneously when the elemental region represents a line portion; that the elemental region under processing represents a colored line portion when the elemental region under processing contains a color pixel and simultaneously when the elemental region represents a line portion; and such that the elemental region under processing represents a color halftone image when the elemental region under processing represents an image other than the line portion.

2. A system as claimed in claim 1 in which said first detection means comprises a color processing circuit supplied with the three primary color signals for producing a maximum color difference signal that is selected from three color difference signals that in turn are defined as an absolute value of the difference in level between any two of the three primary color signals, a first comparator circuit for comparing the same with a first threshold, a second comparator circuit supplied with a maximum color signal defined as one of the three primary color signals that has the largest level, for comparing the same with a second threshold, a logic gate supplied with outputs of said first and second comparator circuits for selectively producing an output only when the level of the maximum color difference signal has exceeded the first threshold and simultaneously when the level of said maximum color signal has exceeded the second threshold.

3. A system as claimed in claim 2 in which said first detection means further comprises a first counter circuit for counting the black pixels that are included in the elemental region and for selectively producing an output only when the number of the black pixels has exceeded a third threshold.

4. A system as claimed in claim 3 in which said first detection means further comprises a second counter circuit supplied with the output of the first counter circuit for counting the elemental region that includes the black pixels with a number exceeding said third threshold, and for selectively producing an output only when the number of the elemental region thus counted has exceeded a fourth threshold.

5. A system as claimed in claim 4 in which said second detection means comprises a third comparator circuit supplied with said maximum color difference signal for comparing the same with a fifth threshold, a fourth comparator circuit supplied with said maximum color signal for comparing the same with a sixth threshold, a logic gate supplied with outputs of said third and fourth comparator circuits for selectively producing an output only when the level of the maximum color difference signal has exceeded the fifth threshold and simultaneously when the level of said maximum color signal has exceeded the sixth threshold.

6. A system as claimed in claim 5 in which said third detection means further comprises a third counter circuit for counting the color pixels that are included in the elemental region and for selectively producing an output only when the number of the color pixels has exceeded a seventh threshold.

7. A system as claimed in claim 6 in which said first detection means further comprises a fourth counter circuit supplied with the output of the first counter circuit for counting the elemental region that includes the color pixels with a number exceeding said third threshold, and for selectively producing an output only when the number of the elemental region thus counted has exceeded an eighth threshold.

8. A system as claimed in claim 1 in which said first recognition circuit comprises a logic product gate that is supplied with outputs of first and second detection means and produces an output in response thereto.

9. A system as claimed in claim 1 in which said elemental region includes a plurality of pixels.

10. A system as claimed in claim 1 in which said elemental region includes a single pixel.

* * * * *